June 4, 1957  L. C. BRUNSTRUM ET AL  2,794,339

PENETROMETER CONE FOR ALL GREASES

Filed May 25, 1955

Inventors.
Lawrence C. Brunstrum,
Arthur C. Borg.
By. Everett A. Johnson
Attorney.

United States Patent Office 2,794,339
Patented June 4, 1957

---

2,794,339

PENETROMETER CONE FOR ALL GREASES

Lawrence C. Brunstrum, Flossmoor, and Arthur C. Borg, Chicago, Ill., assignors to Standard Oil Company, Chicago, Ill., a corporation of Indiana Application May 25, 1955, Serial No. 511,091

5 Claims. (Cl. 73—57)

This invention relates to apparatus for determining the consistency of lubricating greases.

Consistency is the most frequently measured property of a lubricating grease, somewhat analogous to the viscosity of a lubricating oil, and there are well established methods and apparatus for evaluating characteristics of solid lubricants and oils. For example, during the past 30 years, penetration, as described in ASTM D217–52T, has become the international standard for controlling manufacturing operations and specifying purchases of most grades of greases.

The ASTM test provides a procedure for the empirical estimation of the consistency of lubricants by measurement of the extent of penetration of a standard cone, penetration being the depth, in tenths of a millimeter, that a standard cone penetrates the sample. The penetration is determined at 77° F. using a penetrometer to apply the standard cone to the sample in a standard cup for 5 seconds. The penetrometer is so constructed that by suitable adjustment the tip of the cone is placed just at the surface of the level sample while maintaining a "zero" reading on an indicator. The penetrometer cone is supported on a cone shaft which is arranged vertically and releasably held by the penetrometer. The cone shaft and cone are dropped free and after an interval of 5 seconds the indicator shaft is depressed into contact with the top of the cone shaft and the length of fall measured.

The instrument heretofore used utilizes a double taper cone which is capable of testing hard-block greases and NLGI grade greases. However, for the routine testing of semi-fluid greases, softer than NLGI grade 1, there exists no generally acceptable instrument which can be considered equivalent in utility and simplicity of operation to the ASTM cone penetrometer as applied to heavier and block greases. Many attempts have been made to modify the standard tester by using counterbalanced cones and numerous cones of lighter weight and special shapes. None of these prior devices cover the semi-fluid range and are of only limited usefulness.

Recently, an attempt has been made to devise a perforated disc for use on semi-fluid greases. Although reasonably satisfactory for this purpose, such a disc is not usable on the NLGI grades or on the block greases. Obviously, it is very desirable to have a penetrometer test and a penetrometer apparatus which is of equivalent sensitivity in the three general grades of greases and which can be used on all types of greases.

It is, therefore, a primary object of our invention to provide a single, simple, inexpensive device that is capable of testing all greases. It is a further object of the invention to provide an apparatus which may be used in place of the cone now extensively used for the heavier grades. An additional object is to provide a continuous, though empirical, scale for all grades without reflections or gaps. Still another object of the invention is to provide an apparatus which gives identical readings with ASTM D217–52T for the grades now standardized by NLGI. An additional object is to provide an apparatus which is adaptable for universal use on the semi-fluid, regular (NLGI grades 0–6), and the hard-block greases.

Another object of our invention is to provide an apparatus which covers the entire range of greases with an excellent extrapolation of the present ASTM curve for the standardized greases, is easy to duplicate, has excellent repeatability, and is easy to maintain and keep clean. These and other objects of our invention will become apparent as the description thereof proceeds.

Briefly, according to our invention, we provide a cone which in its lower and central portions has a double taper, the central body portion comprising a truncated 90° cone and the lower or tip portion comprising a 30° cone. A short vertical side or skirt extends axially of the central body portion and is a short cylinder having a diameter corresponding to the diameter of the broadest portion of the conical central body. Such a cone yields results on block greases and on regular grades standardized by NLGI which are identical with those obtained using the conventional ASTM D217–52T cone. In addition, when used in a standard sample cup, we can obtain results on semi-fluid greases (heretofore unstandardized) which represent an excellent extrapolation of the curve obtained on other greases by the ASTM method.

The dimensions of our cone and the weight thereof are important and our invention will be described with reference to preferred embodiments thereof which are illustrated in the drawings and wherein.

Figure 1:
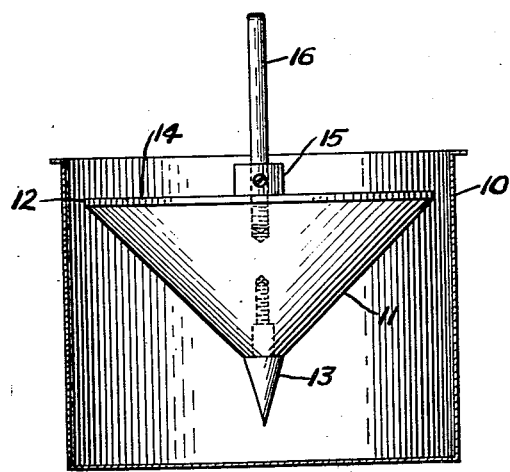
Figure 1 is an elevation of an embodiment of our cone in a standard cup.

Our cone, as shown in Figure 1 of the drawings, comprises a central truncated 90° cone portion 11 having a height of between about 1.246 and about 1.226 inches, a skirt 12 which is about 1/16 inch long, and a hardened stainless steel tip 13 comprising a 30° cone having a height of between about 0.580 and about 0.600 inch merging without any shoulder at its base with the narrowest portion of the truncated cone 11. The base 14 is between about 2.75 and about 2.71 inches in diameter, preferably about 2.730 inches and the skirt 12 about 1/16 inch high.

The shank 15 is typically about 0.375 inch in diameter and the height of it is determined by machining to the desired weight. The shank 15 accommodates a cone shaft 16 which has a diameter of between about 0.122 and about 0.125 inch for attachment to a penetrometer apparatus.

In our preferred embodiment of the invention, we utilize a cone having a total weight of 102.5 grams and, when used in the standard ASTM penetrometer, the falling unit has a gross weight of 150 grams. The test is conventionally made in a cup which is 3 inches in diameter leaving an annulus of about 0.135 inch between the skirt 12 of the cone and the inner wall of the cup 10.

The cone is preferably solid and made of a material having a specific gravity of about 1.75 when constructed to the described dimensions and when it is desired to have a weight of approximately 100 grams when used with a cone shaft weighing about 50 grams. Lighter cones can be used with heavier shafts to give a total dropping weight of 150 grams±0.05 gram. We have found that a suitable material is magnesium or aluminum.

Although the cone assembly has been described as having the shank 15 integral with the cone body 11, it is contemplated that the shank may be a portion of or be carried by the cone shaft 16. In any event, the weight of the complete cone assembly including the cone shaft 16 is preferably about 102.5 grams when used with the conventional ASTM penetrometer shaft.

Figure 3:
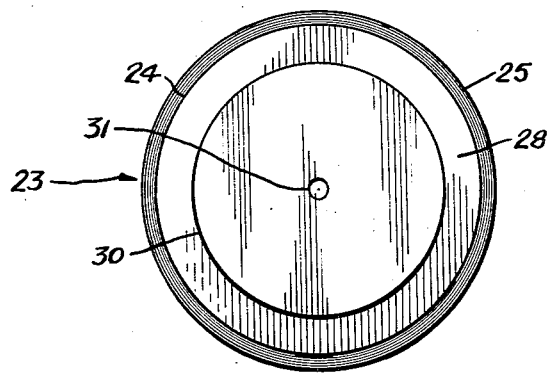
Figure 3 is a plan view of the adapter cover of Figure 2.
Figure 2:
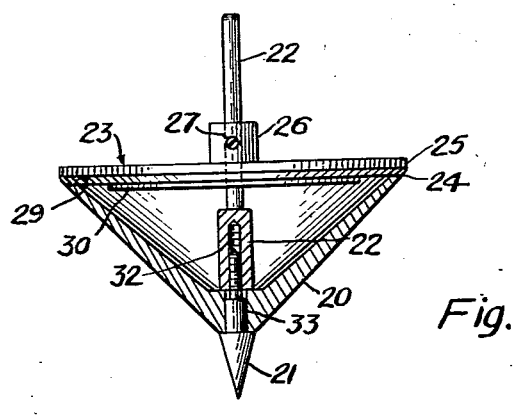
Figure 2 is a vertical section showing a modified ASTM cone according to our invention.

In Figure 1, we have illustrated the assembly as being solid, but if desired it may be hollow in which event a removable cover, made for example of plastic, can be placed over the open base 14 of the hollow cone 11 as shown in Figures 2 and 3.

In Figures 2 and 3, we have illustrated a hollow conical body 20 with a detachable hardened steel tip 21 threaded into the lower end of the shaft 22 with the lower end of the body 20 between. The interior of the cone 20 may be machined to the desired weight which will depend upon the weight of the cap 23 and the weight of the penetrometer shaft (not shown) used with the cone assembly. The cap 23, shown in Figure 3, comprises a disc-like element having a beveled edge 24 corresponding in slope to that of the conical body 20 and comprising an extension thereof so that the total length of the conical surface is equivalent to that of the cone in Figure 1. The tip 21 also corresponds in size and shape to the tip 13 in Figure 1. The circumferential edge of the cap 23 is about 1/16 inch high providing a skirt 25 equivalent to skirt 12 in Figure 1. A slidable stop 26 is fixed to shaft 22 by set screw 27 to secure the annular shoulder 28 on the underside of the cap 23 in fluid-tight contact with the upper rim 29 of the conical body 20. The central boss 30 on the underside of the cap 23 may be machined to attain the desired weight of the cone.

The conical body 20 may be of brass or corrosion resistant steel and the cap 23 may be similarly constructed, although we have found that Lucite or other plastic provides a very satisfactory material. The skirt 25 on the cap 23 may be as much as about 0.25 inch in height, but about 1/16 inch is preferred. The cap 23 is preferably about 2.730 inch in diameter when used with a cup 10 having a 3 inch diameter and the bevel 24 includes an angle of about 45° and has a slope height of about 0.085 inch.

The cap 23 and the conical body 20 should merge in an uninterrupted surface and, if necessary, the annular shoulder 28 may be recessed to receive the rim 29 of the conical body 20. Also, it is contemplated that a sealer, such as an adhesive layer, may be interposed the rim and the cap.

In a typical installation employing the capped cone of Figures 2 and 3, we may use a cone weighing about 102.5 grams, a cone shaft weighing about 15 grams, and a cap weighing about 32.5 grams making the total of 150 grams required by the ASTM test.

The cone diameter, the vertical height of the cone, and the arrangement and height of the skirt 12 and the diameter of the cup 10 determine the rate of submersion in semi-fluid grease. The behavior of the cone and the penetration indications thereof when used on NLGI grade greases and block greases are the same as with the ASTM cone. In this connection, we have obtained penetration data on the cone designed according to our invention, on the D217 cone, on a 30 gram cone, and on a perforated disc, the latter having been proposed by others for specific use on semi-fluid greases. From these penetration data, it is evident that our universal cone, as described herein, embraces the three groups of greases, i. e. the block greases, the NLGI grades, and the heretofore unstandardized semi-fluid grades. Our cone gives identical readings with the D217 cone in the ASTM standardized range.

From the above, it will be apparent that the elements of our device are simple, durable, and readily interchangeable with prior apparatus and it will be apparent that in providing the modified cone we have attained the objects of our invention and have provided an apparatus which is adapted for the rapid routine testing of all types of greases by means of the ASTM penetrometer. The results are easy and readily reproducible and the device is of the desired sensitivity for all types of greases.

This application is a continuation-in-part of our copending application filed April 29, 1955, as Serial Number 504,812, and entitled "Universal Penetrometer Cone," issued as U. S. Patent 2,782,630.

Although embodiments of our invention have been described in some detail, it should be understood that these are by way of illustration only and that the invention is not necessarily limited thereto. Accordingly, modifications of our invention are contemplated without departing from the spirit of the invention.

What we claim is:

1. An apparatus for determining fluid properties of a wide range of lubricants comprising a sample cup having an inner diameter of about 3.0 inches, a penetrometer cone having a solid body portion having the configuration of a truncated 90° cone having a base of about 2.73 inches in diameter, a short skirt extending from the base of said body portion a distance of about 1/16 inch, a stainless steel conical tip extending from the truncated apex of said body portion a distance of about 0.6 inch, a shank fixed to said body portion, and a drilled and tapped bore extending longitudinally within said shank, the gross weight of said assembly being about 102.5 grams.

2. The apparatus of claim 1 wherein said base comprises a removable disc-like member across the base of said cone, and said skirt consists of a cylindrical peripheral edge portion of said member.

3. An apparatus for testing grades of greases from block grease to semi-fluid greases comprising in combination a generally cylindrical cup having an internal diameter of about 3 inches, an exterior annular flange on said cup, an inverted truncated 90 degree cone assembly having a base measuring about 2.73 inches in diameter, a cylindrical extension on said base also measuring about 2.73 inches in diameter and having a height of about 1/16 inch, the said extension and cup providing a flow annulus therebetween of about 0.135 inch, a conical tip comprising a 30 degree cone extending from the truncated apex of said cone a distance of about 0.6 inch, said truncated cone having a height of between about 1.28 and 1.30 inches, and a shank and a cone shaft extending axially of said cone assembly, said shank being adapted to be trimmed to provide a gross weight of about 102.5 grams for the complete cone assembly.

4. An apparatus for testing grades of greases from block grease to semi-fluid greases comprising in combination a generally cylindrical sample cup, an inverted truncated cone assembly adapted to enter said cup and be displaced axially therewithin, a co-axial cylindrical extension of the base of said cone, said cylindrical extension having its outer wall in proximity to the inner wall of said cup to provide a restricted flow annulus therebetween and thereby affording increased resistance to flow of sample between the cone and the cup when the cone is displaced axially therewithin, a steeply tapered tip on said cone removably fixed to the truncated apex of said cone, and a shank and a cone shaft extending axially of said cone assembly, said shank being adapted to be trimmed to provide the desired gross weight of the complete cone assembly.

5. The apparatus of claim 4 wherein said extension comprises a removable disc-like member having a cylindrical peripheral edge portion which is co-axial with the axis of said cone.

References Cited in the file of this patent
UNITED STATES PATENTS 358,877    Perkins _____ Mar. 8, 1887

FOREIGN PATENTS 22,042    Great Britain _____ Feb. 15, 1912

OTHER REFERENCES

Paint Manufacturers, Association of the U. S.; Scientific Section, circular #265, April 1926, pp. 414–417.

American Paint and Varnish Manufacturers Association; Scientific Section, circular #300, by E. F. Hickson, January 1927, pp. 131–132.